United States Patent Office 3,558,617
Patented Jan. 26, 1971

3,558,617
DYESTUFFS DERIVED FROM NAPHTHOYLENE-BENZIMIDAZOLES
Robert Frederic Michel Sureau, Enghien-les-Bains, and Marie Josephe Jeanne Alicot, Soisy-sous-Montmorency, France, assignors to Ugine Kuhlmann, Paris, France
No Drawing. Filed July 14, 1967, Ser. No. 653,317
Claims priority, application France, July 22, 1966, 70,397
Int. Cl. C07d 87/42
U.S. Cl. 260—247.2      3 Claims

ABSTRACT OF THE DISCLOSURE

Dyestuffs of the formula

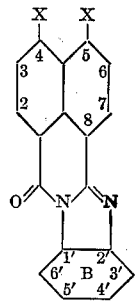

(I)

in which one X represents a hydrogen atom and the other a

radical wherein $R_1$ and $R_2$ each represent hydrogen or an alkyl, cycloalkyl, aryl or aralkyl group, but not simultaneously an aryl group, or $R_1$ and $R_2$ together with the nitrogen to which they are linked form a heterocyclic nucleus. The preparation of such dyestuffs and their use in the colouration of fibres based on polyamides, polyurethanes, polyesters, cellulose acetate or cellulose triacetate.

---

This invention concerns new dyestuffs derived from naphthoylenebenzimidazole and their applications to dyeing.

According to the present invention dyestuffs are provided having the general formula:

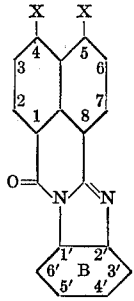

in which one X represents a hydrogen atom and the other a

radical wherein $R_1$ and $R_2$ each represent hydrogen or an alkyl, cycloalkyl, aryl or aralkyl group, which may be substituted by at least one non-water-solubilising group such as chlorine or bromine or an alkoxy, nitrile, trifluoromethyl or hydroxyalcoholic group; or $R_1$ and $R_2$ together with the nitrogen to which they are linked form a heterocyclic nucleus such as for example piperidine or morpholine; and $R_1$ and $R_2$ cannot represent simultaneously an aryl group, the nucleus B may be substituted by at least one non-water-solubilising group such as chlorine or bromine or an alkyl, alkoxy, nitrile or trifluoromethyl group.

The dyestuffs according to the invention may be prepared, for example, by heating a dyestuff of the above formula except that one X represents a chlorine or bromine atom and the other represents a hydrogen atom, with an amine of the formula

($R_1$ and $R_2$ being defined as above). The quantity of amine to be used in this case is at least 2 molecules to one molecule of dyestuff. The reaction temperature is preferably between the boiling temperature of the amine and about 220° C. The time of heating is generally between 3 and 4 hours but may be prolonged if necessary. After cooling, the reaction mass is taken up in boiling water when the amine

is miscible with water, or in more or less concentrated and hot hydrochloric acid in order to remove as the soluble hydrochloride the excess of amine used. The product is then filtered and washed until chlorine or bromine ions have disappeared from the filtrate.

The amine may likewise be condensed with the dyestuffs in an organic solvent in the presence of an agent which absorbs the acids.

The insoluble dyestuff obtained is dispersed by the usual processes, for example, by grinding the moist paste with sodium dinaphthylmethane sulphonate.

The dyestuffs according to the invention, thus dispersed, colour synthetic fibres such as for example fibres based on polyamides, polyurethanes or polyesters, cellulose acetate and cellulose triacetate, in shades ranging from yellow to scarlet, which have very great brilliance and good general fastness.

In the following examples, to which the invention is not limited, the parts are by weight unless the contrary is stated.

EXAMPLE 1

A mixture of 50 parts of 3-trifluoromethylaniline and 19 parts of the dyestuff obtained by condensing 4-bromo-1,8-naphthalic anhydride with 4-methoxy-1,2-phenylenediamine in acetic acid medium is heated at 200° C. for 4 hours. After cooling, the reaction mass is agitated with an excess of about 50% hydrochloric acid. The solid is filtered off, washed with dilute hydrochloric acid and then with water until neutral, and is then drained and dried in an oven at 100° C. 21.7 parts of an insoluble dyestuff are obtained which, after dispersion by the usual processes, dyes fibres based on polyesters in reddish orange shades which have great brilliance and are fast to sublimation.

EXAMPLE 2

A mixture of 15 parts of morpholine and 5.7 parts of the product of the condensation of 4-bromo-1,8-naphthalic anhydride with 4-chloro-1,2-phenylenediamine is heated at 150–160° C. for 4 hours. After cooling to below 100° C. the mass is taken up in hot water, and the solid is filtered off and washed until neutral, and is then drained and dried at 100° C. 4.95 parts of an orange powder are obtained which, after dispersion, dyes fibres based on polyesters in golden yellow shades of great brilliance which have good fastness, especially to light and to sublimation.

In the following table a number of other examples according to the invention are summarised.

| Ex. No. | Substituent of B in 4' or 5' position | HN(R1)(R2)  | Shades on fibres based on polyesters |
|---|---|---|---|
| 3 | | monoethyl-m-toluidine | Greenish yellow. |
| 4 | | monomethylaniline | Do. |
| 5 | | hydroxyethylaniline | Orange. |
| 6 | | 3-trifluoromethyl-aniline | Do. |
| 7 | | morpholine | Golden yellow. |
| 8 | | piperidine | Yellowish orange. |
| 9 | | 2,6-dimethyl-morpholine | Orange yellow. |
| 10 | | N-methyl-monoethanolamine | Orange. |
| 11 | | di(chlorethyl)amine | Greenish yellow. |
| 12 | Cl | aniline | Orange. |
| 13 | Cl | monoethyl-m-toluidine | Yellow. |
| 14 | Cl | monoethylaniline | Orange yellow. |
| 15 | Cl | hydroethylaniline | Do. |
| 16 | Cl | 3-trifluoromethyl-aniline | Do. |
| 17 | Cl | piperidine | Yellowish orange. |
| 18 | Cl | 2,6-dimethyl-morpholine | Do. |
| 19 | Cl | N-methyl-monoethanolamine | Orange. |
| 20 | Cl | di(chlorethyl)amine | Greenish yellow. |
| 21 | CH₃ | aniline | Orange. |
| 22 | CH₃ | p-anisidine | Red orange. |
| 23 | CH₃ | monoethyl-m-toluidine | Yellow. |
| 24 | CH₃ | hydroxyethylaniline | Orange yellow. |
| 25 | CH₃ | monomethylaniline | Yellow. |
| 26 | CH₃ | 3-trifluoromethyl-aniline | Yellowish orange. |
| 27 | CH₃ | morpholine | Golden yellow. |
| 28 | CH₃ | piperidine | Yellowish orange. |
| 29 | CH₃ | 2,6-dimethyl-morpholine | Orange. |
| 30 | CH₃ | N-methyl-monoethanolamine | Do. |
| 31 | CH₃ | di(chlorethyl)amine | Greenish yellow. |
| 32 | OCH₃ | monomethylaniline | Golden yellow. |
| 33 | OCH₃ | monoethyl-m-toluidine | Yellow. |
| 34 | OCH₃ | hydroxyethylaniline | Yellowish orange. |
| 35 | OCH₃ | morpholine | Orange yellow. |
| 36 | OCH₃ | piperidine | Orange. |
| 37 | OCH₃ | 2,6-dimethyl-morpholine | Do. |
| 38 | OCH₃ | di(chlorethyl)amine | Do. |

We claim:
1. A compound of the formula:

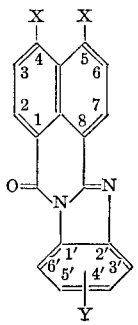

in which Y is in the 4' or 5' position and represents hydrogen, chlorine, bromine, methyl or methoxy, one X represents hydrogen and the other represents the amino grouping of the formula:

$$-N\diagdown\begin{matrix}R_1\\R_2\end{matrix}$$

wherein $R_1$ is hydrogen, alkyl, haloalkyl, hydroxyalkyl, said alkyl group having one or two carbon atoms and $R_2$ is alkyl, haloalkyl, hydroxyalkyl, said alkyl group having one or two carbon atoms, phenyl, methylphenyl, methoxyphenyl or trifluoromethyl-phenyl.

2. A compound of the formula:

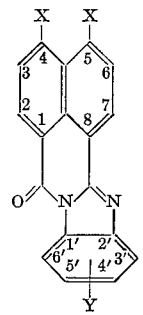

in which Y is in the 4' or 5' position and represents hydrogen, chlorine, bromine, methyl or methoxy, one X represents hydrogen and the other represents piperidino, morpholino or 2,6-dimethyl-morpholino.

3. A compound according to claim 2 wherein Y represents chlorine, one X represents hydrogen and the other represents morpholino.

References Cited

UNITED STATES PATENTS 3,444,172  5/1969  Senshu _____ 260—282

ALEX MAZEL, Primary Examiner

J. TOVAR, Assistant Examiner

U.S. Cl. X.R.

8—25; 260—282